United States Patent Office 3,555,125
Patented Jan. 12, 1971

3,555,125
PRODUCTION OF MONO- AND
DI-ALKYLPHOSPHITES
John D. Curry, Oxford, Ohio, assignor to The Procter & Gamble Company, Cincinnati, Ohio, a corporation of Ohio
No Drawing. Filed Dec. 7, 1967, Ser. No. 688,691
Int. Cl. C07f 9/08, 9/40
U.S. Cl. 260—980
5 Claims

ABSTRACT OF THE DISCLOSURE

Mono- and di-alkylphosphites are produced by the reaction of phosphorus trioxide, $P_4O_6$, with an excess, greater than a 6:1 molar ratio, of an aliphatic alcohol containing from about 1 to about 20 carbon atoms. The desired phosphite reaction products are present in an equimolar ratio and can be separated by conventional methods. The mono- and di-alkylphosphites are useful for preparing phosphorous-containing organic phosphonate and phosphinate compounds which are useful as wetting agents, detergents, plasticizers, bonding agents, lubricants, corrosion inhibitors and flame proofing agents.

BACKGROUND OF THE INVENTION

Several general methods for the synthesis of alkylphosphites are available in the prior art. These processes involve various severe problems and difficulties which make them undesirable from a practical and economic viewpoint. Thorpe et al., J. Chem. Soc., 57, 634 (1890) discloses a process whereby ethanol is added dropwise to $P_4O_6$ with ice and salt necessarily present to prevent inflammation at ordinary temperatures and the product obtained is diethylphosphite. Riess et al., Inorganic Chemistry, 5, 178–83 (1966) discloses the reaction of $P_4O_6$ with methanol. It is stated that this reaction yields carbon char, a yellow solid, gaseous products and under some conditions spontaneous flaming was observed. It was further stated that the reaction was never tamed satisfactorily, not even by the use of solvents and cooling. U.S. Pat. 2,661,364, Einsberger et al., issued Dec. 1, 1953, claims generally the preparation of di-alkylphosphites by the interaction in situ of oxygen, white phosphorus and an alcohol over a period of time of from five to thirty hours. Other references in the prior art also speak of vigorous reactions involving explosions, inflammation, low yields and various side products resulting from attempts to prepare alkylphosphites. The present invention represents a substantial improvement in the sense that high equimolar yields of mono- and di-alkylphosphites are provided in a relatively facile and gentle reaction in quick order.

The mono- and di-alkylphosphites of this invention can be separated by distillation or other known methods and have known utility; for example, they can be utilized in the manufacture of numerous phopshorus-containing organic phosphonate and phosphinate compounds which are useful as wetting agents and detergents, plasticizers for many plastics and resins, bonding agents for asphalt and similar compositions, lubricants and lubricant additives, corrosion inhibitors, flame proofing agents and general agricultural and household chemicals, as described in U.S. Pat. 2,724,718, Stiles et al., issued Nov. 22, 1955. They can also be used for preparing dialkyl alkyl phosphonates, e.g., didodecyl dodecylphosphonate, according to the procedure described in U.S. Pat. 3,064,031, issued Nov. 13, 1962. Such phosphonates have been suggested as useful plasticizers, synthetic lubricants, flame retardants, and textile treating agents. In addition, copending U.S. application Ser. No. 578,166, Zimmerer, filed Sept. 9, 1966, describes a reaction between compounds of the present invention nad random aliphatic olefins to prepare long chain organic phosphonates which are especially useful as corrosion inhibitors.

One of the principal objects of the present invention is, therefore, to provide a novel, safe process for the production of mono- and di-alkylphosphites which is not subject to the problems and difficulties of the above and other prior art processes.

It is a further object of the present invention to provide a rapid one-step process for the production of mono- and di-alkylphosphites by the reaction of phosphorus trioxide, $P_4O_6$, and an excess of an aliphatic alcohol.

Other objects and advantages of the present invention will be readily apparent to one skilled in the art from the following description.

SUMMARY OF THE INVENTION

These objects are achieved by the present invention which is directed to a process for the reaction of phosphorus trioxide, $P_4O_6$, with an aliphatic alcohol which contains from about 1 to about 20 carbon atoms. The process comprises mixing the phosphorus trioxide, $P_4O_6$, with a molar excess of alcohol in the absence of oxygen and water, with stirring, to form an equimolar mixture of mono- and di-alkylphosphites in excellent yield. The reaction may be illustrated as follows:

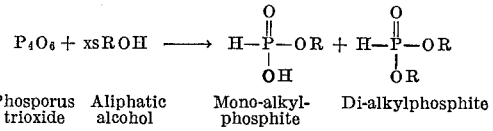

| Phosporus trioxide | Aliphatic alcohol | Mono-alkyl- phosphite | Di-alkylphosphite |

The phosphorus trioxide, $P_4O_6$, useful in the present invention as a reactant can be made according to the process in Whyte et al., copending U.S. application Ser. No. 566,482, filed July 20, 1966, or by any other previously known suitable method.

The aliphatic alcohols which can be utilized in the process of the present invention contain straight or branched chain alkyl groups containing from about 1 to about 20 carbon atoms. Aliphatic alcohols containing more than about 12 carbon atoms can be utilized if suitable solvents, e.g., chloroform, benzene, and the like, are added to solve the solubility problems that may arise from the use of such alcohols. If branched chain aliphatic alcohols are utilized, the mono- and di-alkylphosphite products are somewhat less stable than if the corresponding straight chain aliphatic alcohols are used. If distillation is the desired method of separation of the mono- and di-alkylphosphite products then primary aliphatic alcohols are preferred over secondary aliphatic alcohols, because such are easier to separate utilizing this method of separation. For the same reason, i.e., ease of separation of the products, the mono-alcohols are preferred over the poly-alcohols. Aliphatic alcohols containing from about 1 to about 10 carbon atoms are preferred to obtain the best results of the present invention. A preferred aliphatic alcohol is 2-propanol.

Other aliphatic alcohols which are suitable for use in the present invention include: methanol, ethanol, 1-propanol, 1-butanol, 2-butanol, 2-methyl-1-propanol, 2-methyl-2-propanol, 1-octanol, 1-tetradecanol, 1-eicosanol, 5-pentadecanol, 3-tetradecanol, 2-ethyl-1-tridecanol, 5-methyl-1-nonadecanol, 1,2-ethanediol, 1,2,3-propanetriol, mannitol, sorbitol, and mixtures thereof.

When any of the above aliphatic alcohols are utilized in the process of the present invention, the corresponding mono- and di-alkylphosphites are formed, e.g., when ethanol is reacted with $P_4O_6$ the products are monoethylphosphite and diethylphosphite.

The ratio of alcohol to phosphorous trioxide, $P_4O_6$, is an essential and critical part of this invention. The ratio must be greater than about 6:1, on a molar basis of alcohol to $P_4O_6$, in order to insure a substantially quantitative yield of mono- and di-alkylphosphites and not various undesired side products. A molar ratio of 6:1 is the stoichiometric proportion, and the term "excess" as used herein means any amount greater than 6:1, alcohol to $P_4O_6$ on a molar basis. An upper limit for the proportion will be determined entirely by such practical considerations as size of equipment, quantity of product, economics, batch versus continuous operation, and the like. If less than about a 6:1 ratio, i.e., less than a stoichiometric amount, is used other phosphorus-containing by-products are formed which contaminate the desired final products. Although applicant does not intend that this invention be bound by any theory, it is believed that when less than a 6:1 ratio of alcohol to $P_4O_6$ exists the $P_4O_6$ preferentially reacts with the acidic hydrogen of the mono-alkylphosphite being formed to yield other than the desired phosphorus products. It has unexpectedly been discovered that this undesired reaction will not be favored when there is greater than about a 6:1 ratio of alcohol to $P_4O_6$. When the ratio of alcohol to $P_4O_6$ is increased above 6:1, the desired phosphite reaction products are produced in equimolar amounts. It has been found that the ratio of alcohol to $P_4O_6$ can be up to 50:1 or even greater without affecting the product distribution. It is, however, necessary to maintain an excess of alcohol throughout the reaction period to insure formation of only the desired products. Preferably the ratio of alcohol to $P_4O_6$ is at least about 8:1.

The desired reaction proceeds if the $P_4O_6$ is added to the excess alcohol to insure the completeness of the reaction with no side reactions resulting in the formation of undesired side products. This essential procedure also is consistent with the need for providing an excess of alcohol throughout the reaction. The mixing of the reactants to form the mono- and di-alkylphosphites is performed under an inert (non-reactive) gas atmosphere because of the reactivity of the $P_4O_6$. If oxygen is present $P_4O_6$ will oxidize to the pentavalent form $P_4O_{10}$. Any inert gas, such as nitrogen, helium, argon, or the like can be used to prevent the undesired oxidation.

The reaction of the present invention should be carried out in the absence of water, i.e., under substantially anhydrous conditions (less than 1% water), to prevent the formation of phosphorous acid, $H_3PO_3$. The most desirable condition would be the complete absence of water because any amount of water present leads to the formation of a corresponding amount of $H_3PO_3$. If water is present the $P_4O_6$ tends to react preferentially with it instead of with the alcohol, and $H_3PO_3$ will be produced lowering the yield of the desired mono- and di-alkylphosphites.

The reactants are mixed preferably with mechanical agitation and cooling. The reaction temperature is from about 10° C. to about 80° C. Within this broad range the products formed when particular secondary and tertiary alcohols are utilized, e.g., tert-butyl alcohol, tend to decompose at the higher temperatures of the range and appropriate care must be taken to prevent this. If the temperature is above about 80° C., the possibilities of converting the phosphorus trioxide, $P_4O_6$, to undesirable side products are greatly increased. If the temperature is below about 10° C., there is an increased possibility that the phosphorus trioxide, $P_4O_6$, will solidify and this will necessitate the use of additional alcohol as a solvent. The reaction temperature is subject to the boiling point of the aliphatic alcohol used as a reactant and should be chosen in accordance with this factor, i.e., the reaction temperature should not, in any event, exceed the decomposition temperature of the phosphite products being formed. Temperatures of from about 30° C. to about 55° C. are preferred to achieve the best results of the present invention. The reaction is carried out at atmospheric pressure.

The reaction of the present invention is exothermic and very rapid, almost instantaneous, and for this reason does not usually require an external heat source or pre-heating step. However, it is preferred to add small amounts of heat to insure that no induction period takes place. The reaction is initiated upon contact of the reactants.

The reaction can take place in any form of reactor designed to maintain the necessary reaction conditions, e.g., the absence of oxygen and water. As mentioned above, the reactants can be fed into the reactor in any convenient manner although the addition of the phosphorus trioxide, $P_4O_6$, to the excess alcohol is preferred. If desired, inert solvents can be used in this mixing step to increase the cooling and agitation efficiency although such is not required. The useful inert solvents include benzene, chloroform, ethyl ether and the like.

The time of the reaction is from about 1 second to about 45 minutes, preferably from about 1 to about 30 minutes. After chemical equilibrium of the reaction is achieved, there is present an equimolar mixture of mono- and di-alkylphosphites. This mixture of alkylphosphites can be used as such, e.g., in the preparation of alkyl phosphonates for use in detergents. It is, however, preferred to separate the alkylphosphites before proceeding to utilize them in other reactions as reactants. This separation can be achieved by conventional distillation or extraction procedures.

The following examples will illustrate in detail the manner in which the invention may be practiced. It will be understood, however, that the invention is not confined to the specific limitations set forth in the individual examples, but rather to the scope of the appended claims.

PREFERRED EMBODIMENTS

Example I 7.70 grams (0.035 mole) of phosphorus trioxide, $P_4O_6$, predissolved in 62 ml. of benzene were added to an addition funnel. This addition funnel was part of a reactor assembly consisting of a three-necked round-bottom flask equipped with a stirring device (magnetic stirring bar), a condenser with a drying tube at the exit, a thermometer and nitrogen inlet. This reactor assembly was completely closed except for the inlet for nitrogen, and the exit of the condenser which was fitted with a drying tube.

A stream of dry high purity nitrogen was maintained throughout the system at all times. The glass reactor assembly was dried in an oven (100° C.) prior to its assembly in order to minimize the water present. The glass drying tube was filled with calcium chloride, $CaCl_2$, as a granular dessicant to prevent moisture in the air from entering the reactor assembly but to allow the nitrogen flow to exit through it.

The phosphorus trioxide-benzene solution was added slowly over a period of five minutes to a stirred solution of 2-propanol consisting of 16.99 grams (0.282 mole) until complete chemical equilibrium was achieved. The ratio of 2-propanol to $P_4O_6$ was 8:1. Cooling was provided as needed to the round-bottom flask. The temperature was allowed to rise to 67° C. After the addition of the phosphorus trioxide solution to the alochol, the excess alcohol and benzene were removed by distillation using a flash evaporator. The reaction was a facile and gentle one and no explosions or inflammation was observed.

The mixture was assayed by standard electronic integration methods and determined to consist of two components in a 1:1 ratio, i.e., mono-isopropylphosphite and di-isopropylphosphite. The di-isopropylphosphite was separated by means of a vacuum distillation utilizing a water aspirator. A nuclear magnetic resonance spectrometer showed a phosphorus-31 chemical shift of −4.5 p.p.m. relative to phosphoric acid at 0 p.p.m. and a $J_{p-h}$ value of about 685 cycles per second. This and the proton magnetic resonance spectrum definitely identified the sample as diisopropylphosphite which is useful in the reactions described in the aforementioned U.S. Pats. 2,724,718 and 3,064,031, e.g., to prepare compounds of known utility such as diisopropylhexane-1-phosphonate.

Substantially the same results are obtained in that the corresponding mono- and di-alkylphosphites are formed in the process of Example I when any of the following aliphatic alcohols are substituted on an equal molar basis for 2-propanol in Example I: 1-propanol, 1-butanol, 2-butanol, 2 - methyl - 2 - propanol, 1 - octanol, 1 - tetradecanol, 1-eicosanol, 5-pentadecanol, 3-tetradecanol, 2-ethyl-1-tridecanol, 5-methyl-1-nonadecanol, 1,2-ethanediol, 1,2,3-propanetriol, mannitol, sorbitol, and mixtures thereof.

Examples II–VII

Additional runs according to the process of Example I were carried out with the exception that the ratios of alcohol to phosphorus trioxide and the aliphtic alcohols used varied. The reaction products from each example find utility for preparing known useful materials such as those described in U.S. Pats. 2,724,718 and 3,064,031. The results of these additional runs are summarized as Examples II–VII in the following table:

|  | Alcohol | Temperature, °C. | Alcohol/$P_4O_6$, molar ratio | Yields | |
|---|---|---|---|---|---|
|  |  |  |  | Di-alkyl-phosphite | Mono-alkyl-phosphite |
| Example:[1] |  |  |  |  |  |
| II | 2-propanol | 67 | 8:1 | 50 | 50 |
| III | do | 53 | 22:1 | 50 | 50 |
| IV | 2-methyl-1-propanol | 40 | 8:1 | 50 | 50 |
| V | Methanol | 21 | 12:1 | 50 | 50 |
| VI | Ethanol | 14 | 53:1 | [2] 48 | [2] 47 |
| VII | 2-propanol | 42 | 3:1 | ([3]) | ([3]) |

[1] In each of the examples an inert nitrogen atmosphere was used and care exercised as in Example I to provide a substantially anhydrous reaction condition.
[2] The balance 5% consisted of byproducts of side reactions.
[3] The phosphorus magnetic resonance spectrum measurements indicated the presence of three to four phosphorus-containing species in the yellow reaction product obtained. The reaction was so contaminated with byproducts that analysis was not practical.

Example VII where less than a stoichiometric 6:1 ratio alcohol to $P_4O_6$ was utilized, i.e., 3:1, demonstrates the criticality of this ratio and the necessity to the present invention of maintaining at least the minimum of this ratio to achieve the desired results.

In addition to the preferred embodiments described herein, other modifications and variations within the spirit of the invention and the scope of the appended claims will occur to those skilled in the art.

All ratios described above are on a molar basis unless otherwise specified.

What is claimed is:
1. A process for preparing a 1:1 mixture, on a molar basis, of mono- and di-alkylphosphites by reacting phosphorus trioxide with an aliphatic alcohol which contains from about 1 to about 20 carbon atoms which comprises adding the phosphorus trioxide to an excess of the aliphatic alcohol with the molar ratio of aliphatic alcohol to phosphorus trioxide being in the range of 6:1 to 50:1 at a temperature of from about 10° C. to about 80° C. in an inert atmosphere and under substantially anhydrous conditions until substantially complete chemical equilibrium is achieved.

2. The process of claim 1 wherein the aliphatic alcohol used is selected from the group consisting of methanol, ethanol, 1-propanol, 2-propanol, 1-butanol, 2-butanol, 2-methyl-1-propanol, and 2-methyl-2-propanol.

3. The process of claim 1 wherein the aliphatic alcohol used is 2-propanol.

4. The process of claim 1 wherein the ratio of aliphatic alcohol to phosphorus trioxide is about 8:1.

5. The process of claim 1 wherein the temperature is from about 30° C. to about 55° C.

References Cited

Thorpe et al., "J. of Chem. Soc." (London), vol. 57 (1890), pp. 634–6.

CHARLES B. PARKER, Primary Examiner

A. H. SUTTO, Assistant Examiner

U.S. Cl. X.R.

260—961, 967